(12) United States Patent
Zhu

(10) Patent No.: US 6,695,909 B1
(45) Date of Patent: Feb. 24, 2004

(54) CONCRETE WITH IMPROVED FREEZE/THAW CHARACTERISTIC

(75) Inventor: Han Zhu, Chandler, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 10/209,450

(22) Filed: Jul. 30, 2002

Related U.S. Application Data

(60) Provisional application No. 60/311,491, filed on Aug. 10, 2001.

(51) Int. Cl.[7] ............................................. C04B 18/22
(52) U.S. Cl. ....................... 106/724; 106/696; 106/745; 464/32
(58) Field of Search ................................ 106/724, 745, 106/696; 404/32

(56) References Cited

U.S. PATENT DOCUMENTS

| | | | |
|---|---|---|---|
| 4,322,167 A | 3/1982 | Hill | |
| 4,415,267 A | 11/1983 | Hill | |
| 4,772,647 A | 9/1988 | Grossi et al. | |
| 5,272,284 A | 12/1993 | Schmanski | |
| 5,290,356 A | * 3/1994 | Frankowski | 106/726 |
| 5,391,226 A | * 2/1995 | Frankowski | 106/696 |
| 5,456,751 A | * 10/1995 | Zandi et al. | 106/724 |
| 5,482,550 A | 1/1996 | Strait | |
| 5,494,502 A | 2/1996 | DeLong | |
| 5,735,948 A | 4/1998 | Cha et al. | |
| 5,852,062 A | 12/1998 | Carpenter | |
| 5,852,077 A | * 12/1998 | Zawada et al. | 524/8 |
| 5,918,429 A | 7/1999 | Hicks et al. | |
| 5,936,015 A | 8/1999 | Burns | |
| 5,938,832 A | 8/1999 | Memon | |
| 6,035,591 A | 3/2000 | Hicks et al. | |
| 6,083,318 A | * 7/2000 | Zawada et al. | 106/718 |
| 6,084,011 A | 7/2000 | Lucero et al. | |
| 6,156,828 A | 12/2000 | Wickett | |
| 6,291,019 B1 | 9/2001 | Locke et al. | |
| RE37,655 E | 4/2002 | Supplee | |

OTHER PUBLICATIONS

Goulias, D. G., Ali, A. H.M., "Use of tire rubber in hot mix asphalt: binder and mixture evaluation" *Journal of Solid Waste Technology and Management*, 24, 3 121–125 (1997).

Ghaly, A.M., "Properties of asphalt rubberized with waste tires crumb" *Journal of Solid Waste Technology and Management*, 26, 1 45–50 (1999).

Zhu, H., Carlson, D.D., "A spray based crumb rubber technology in highway noise reduction application" *Journal of Solid Waste Technology and Management* 27, 1 27–33 (2001).

* cited by examiner

*Primary Examiner*—Paul Marcantoni
(74) *Attorney, Agent, or Firm*—Gallagher & Kennedy, P.A.; Thomas D. MacBlain

(57) ABSTRACT

An improved freeze/thaw characteristic is achieved in concrete by substituting crumb rubber for entrained air. The percent by volume of entrained air for concrete prescribed for a given set of freeze/thaw conditions is first determined then a predetermined quantity of crumb rubber is introduced into the mix in dependence on the percent of air entrained in the prescribed air entrained concrete.

8 Claims, No Drawings

CONCRETE WITH IMPROVED FREEZE/THAW CHARACTERISTIC

CROSS REFERENCE TO RELATED APPLICATIONS

This application claims priority from the provisional patent application Ser. No. 60/311,491 filed Aug. 10, 2001 in the name of Han Zhu entitled "Crumb Rubber Portland Cement Concrete," incorporated herein by reference.

FIELD OF THE INVENTION

This invention relates to concrete with improved freeze/thaw tolerance, and more particularly to such concrete in which crumb rubber replaces some or all entrained air ordinarily incorporated to enhance freeze/thaw tolerance.

BACKGROUND OF THE INVENTION

The concrete mixing and placing process will inevitably make some air voids entrapped in concrete. Typically, the content for those entrapped air voids in concrete is about 1% to 3% in terms of total concrete volume. However, building concrete outdoor structures in a cold climate typically requires a design of 5% air content or more in concrete for the purpose of increasing concrete's ability to resist freeze/thaw damage. The increase in air content can be achieved by adding an additive called air entraining agent (AEA). So, after AEA is added, concrete has both entrapped air voids and entrained air voids. The manufacturers of AEA will label the amount needed to yield a given percentage of entrained air for one cubic yard of concrete. This is a simple design routine.

At the same time, however, AEA weakens concrete, and compensation is needed. More cement is put into concrete for this purpose to make concrete "stronger." This drives cost up since cement is the most expensive ingredient in concrete.

There remains, therefore, the need for a concrete with the ability to resist freeze/thaw damage, but without the attendant increase in cost that the addition of air entrainment agents and additional cement bring.

BRIEF SUMMARY OF THE INVENTION

In accordance with this invention, in concrete designed for use in locales where repeated freezing and thawing occurs, crumb rubber is added to the mix while air entrainment agents are reduced or eliminated so that entrained air is reduced or eliminated. The increase in cement and its attendant cost increase can be eliminated while a concrete with improved freeze/thaw tolerance is nevertheless produced.

In a method of making the concrete in accordance with this invention the percentage of air in air entrained concrete is conventionally determined for the anticipated freeze/thaw conditions to be tolerated and depending upon the percentage of air, the amount of crumb rubber content is arrived at for a crumb rubber concrete having the desired tolerance to the predetermined freeze/thaw conditions.

In a further embodiment of the invention, the crumb rubber replaces all of the entrained air that ordinarily would be brought into the mix by the air entrainment agent.

A concrete with designed 3000 psi 28-day compressive strength in a cold climate in accordance with this invention comprises, per cubic yard, 350 to 425 lbs. of cement, 0 to 100 lbs. of fly ash, 170 to 300 lbs. water, 1000 to 1500 lbs. of sand, 1100 to 1900 lbs. of coarse aggregate, 0% to 4% air and 5 to 32 lbs. of crumb rubber, and other appropriate amounts of additives excluding an air entraining agent.

The above and further objects and advantages of the invention will be better understood from the following detailed description of at least one preferred embodiment of the invention, taken in consideration with the accompanying drawings.

DETAILED DESCRIPTION

Rubber concrete is a mix of crumb rubber sized between 10 mesh to 20 mesh with conventional Portland cement concrete. The inventor has observed from the tests done on rubber concrete at Arizona State University that rubber concrete is more ductile than conventional concrete. This suggested to the inventor that rubber concrete may have the ability to better resist freeze/thaw damages than conventional concrete.

Flagstaff in Arizona is a cold area where during the months of October to April, the lowest daily temperature will reach below the freezing point. Concrete in Flagstaff will experience a daily freeze/thaw temperature cycle, which causes damage to concrete.

On Apr. 26, 2002, four concrete mixes were placed on the campus of Northern Arizona University (NAU) in Flagstaff, Ariz. Among the four mix designs, three are rubber concrete. The four mixes are: Mix-1, the city mix with 6% air entrainment (conventional design); Mix-2, the same city mix as given in Mix-1 but with reduced air content (3% air entrainment) and an additional 15 lbs. of crumb rubber per cubic yard of fresh concrete; Mix-3, the same city mix as given in Mix-1 but with reduced air content (0% air entrainment) and an additional 20 lbs. of crumb rubber per cubic yard of fresh concrete; Mix-4, the same city mix as given in Mix-1 but with reduced air content (0% air entrainment) and 60 lbs. of crumb rubber per cubic yard of fresh concrete. The mix design for Mix-1 is as follows:

| City Mix Design for NAU test section (3000 psi): | | |
|---|---|---|
| | Weight/lbs. | Volume/cubic ft. |
| Cement | 442 | 2.24 |
| Fly ash | 95 | 0.68 |
| Water | 283 | 4.53 |
| Sand | 1293 | 7.87 |
| Coarse Aggregate | 1740 | 10.02 |
| Air | 6% | 1.62 |
| Water/reducer | 32 oz. (brand name: Pozzolith 80) | |
| Air entrainment agent | 7 oz. (brand name: Micro Air) | |

A systematic sampling and testing was conducted. Twelve cylinders for Mix-1, Mix-2, Mix-3 and Mix-4 were taken, respectively. In addition, 12 cylinders for Mix-2 before crumb rubber was added were taken (labeled Mix-2a). Twelve cylinders of Mix-3 before crumb rubber was added were taken (labeled Mix-3a). The slump number, weight, 7-day and 28-day compressive strength for those cylinders are given in Table 1. It needs to be pointed out that Mix-2 and Mix-2a cylinders were taken from the same concrete truck. Mix-3, Mix-3a and Mix-4 cylinders were taken from the same concrete truck.

The 7-day compressive strength for Mix-1, Mix-2, Mix-3 and Mix-4 are 16.0 MPa (2328 psi), 22.5 MPa (3263 psi), 24.8 MPa (3601 psi) and 14.5 MPa (2109 psi) respectively. The 28-day compressive strength for Mix-1, Mix-2, Mix-3 and Mix-4 are 22.1 MPa (3203 psi), 32.9 MPa (4775 psi), 35.1 MPa (5093 psi) and 20.1 MPa (3044 psi) respectively. It can be seen from Table 1 that the compressive strengths for Mix-2 and Mix-3 exceed that for Mix-1. Based on the test results and the characteristics of ductility increase for rubber concrete, the inventor proposed that rubber concrete can be used to replace air entrained concrete with the improvement in compressive strength. The design change that features the correspondence between the designed air content for conventional concrete and the crumb rubber amount per cubic yard of rubber concrete is given in Table 2. The air content percentage prescribed for anticipated weather conditions can be looked up in any of a number of concrete design manuals commonly used in the industry.

TABLE 1

| Type | Description | Slump | % Air | Weight | Strength 7-day (psi) | Strength 28-day (psi) |
|---|---|---|---|---|---|---|
| Mix-1 | 6% entrained air with no crumb rubber | 6.0" | 8.50% | 139.8 lbs./cu. ft. | 2328 | 3203 |
| Mix-2 | 4% entrained air with 15 lbs./cu. yd. crumb rubber | 3.5" | 4.90% | 139.4 lbs./cu. ft. | 3263 | 4775 |
| Mix-2a | 4% entrained air with no crumb rubber | 5.0" | 4.90% | 139.8 lbs./cu. ft. | 3422 | 5292 |
| Mix-3 | No entrained air with 20 lbs./cu. yd. crumb rubber | 4.0" | 2.90% | 140.2 lbs./cu. ft. | 3601 | 5093 |
| Mix-3a | No entrained air with no crumb rubber | 5.0" | 1.80% | 141.8 lbs./cu. ft. | 4238 | 5810 |
| Mix-4 | No entrained air with 60+ lbs./cu. yd. crumb rubber | 3.75" | 5.40% | 137.8 lbs./cu. ft. | 2109 | 3044 |

TABLE 2

| Air content for air entrained concrete | Crumb rubber amount allowed for per cubic yard of rubber concrete, which is a replacement of air entrained concrete |
|---|---|
| 3% | Between 5 lbs. to 15 lbs. |
| 4% | Between 8.33 lbs. to 18.33 lbs. |
| 5% | Between 11.66 lbs. to 21.66 lbs. |
| 6% | Between 15 lbs. to 25 lbs. |
| 7% | Between 18.33 lbs. to 28.33 lbs. |
| 8% | Between 21.66 lbs. to 31.66 lbs. |

Put another way, if the air content prescribed for a given freeze/thaw condition is a percentage figure appearing in the left column of Table 2, then the associated crumb rubber content should be used in lieu of air entrainment agent to arrive at a satisfactory concrete without the need to increase cement content. As known in the art, the percent air prescribed is a mere matter of looking up the value for the local weather conditions.

In a further embodiment, a compromise mix is contemplated in which the air entertainment is reduced but not eliminated, while crumb rubber content, which may be somewhat less than that set forth in Table 2, is also included.

Although preferred embodiments of the invention have been described in detail, it will be readily appreciated by those skilled in the art that further modifications, alterations and additions to the invention embodiments disclosed may be made without departure from the spirited scope of the invention as set forth in the appended claims.

I claim:

1. A method of manufacturing a concrete for improved freeze/thaw characteristics including:
    a) determining the percentage entrained air in air entrained concrete prescribed for the temperature ranges to be encountered by the concrete being manufactured, and
    b) adding crumb rubber as a replacement of entrained air to a mix of cement, fly ash, water, sand and coarse aggregate in an amount per cubic yard of rubber concrete
        i) between 5 lbs. to 15 lbs., when the volume of air determined in step (a) is 3%,
        ii) between 8.33 lbs. to 18.33 lbs., when the volume of air determined in step (a) is 4%,
        iii) between 11.66 lbs. to 21.66 lbs., when the volume of air determined in step (a) is 5%,
        iv) between 15 lbs. to 25 lbs., when the volume of air determined in step (a) is 6%,
        v) between 18.33 lbs. to 28.33 lbs., when the volume of air determined in step (a) is 7%, and
        vi) between 22.66 lbs. to 31.66 lbs., when the volume of air determined in step (a) is 8%.

2. A method of manufacturing a concrete for improved freeze/thaw characteristics including:
    a) determining a volume of entrained air prescribed for improving freeze/thaw characteristics of a concrete for temperature conditions anticipated for the concrete in question; and
    b) adding to the concrete mix an amount of crumb rubber dependent on the volume of entrained air determined in step (a).

3. The method according to claim 2, wherein the volume of entrained air determined in step (a) is approximately 3%, and the amount of crumb rubber added in step (b) is substantially 5 lbs. to 15 lbs. per cubic yard of concrete.

4. The method according to claim 2, wherein the volume of entrained air determined in step (a) is approximately 4%, and the amount of crumb rubber added in step (b) is substantially 8.33 lbs. to 18.33 lbs. per cubic yard of concrete.

5. The method according to claim 2, wherein the volume of entrained air determined in step (a) is approximately 5%, and the amount of crumb rubber added in step (b) is substantially 11.66 lbs. to 21.66 lbs. per cubic yard of concrete.

6. The method according to claim 2, wherein the volume of entrained air determined in step (a) is approximately 6%, and the amount of crumb rubber added in step (b) is substantially 15 lbs. to 25 lbs. per cubic yard of concrete.

7. The method according to claim 2, wherein the volume of entrained air determined in step (a) is approximately 7%, and the amount of crumb rubber added in step (b) is substantially 18.33 lbs. to 28.33 lbs. per cubic yard of concrete.

8. The method according to claim 2, wherein the volume of entrained air determined in step (a) is approximately 8%, and the amount of crumb rubber added in step (b) is substantially 21.66 lbs. to 31.66 lbs. per cubic yard of concrete.

* * * * *